(12) United States Patent
Schmidt

(10) Patent No.: US 7,231,239 B2
(45) Date of Patent: Jun. 12, 2007

(54) SUPER CONDUCTING CABLE CONDUCTOR WITH REBCO-COATED CONDUCTOR ELEMENTS

(76) Inventor: Frank Schmidt, 30855 Langenhagen, Langenhagen (DE)

( * ) Notice: Subject to any disclaimer, the term of this patent is extended or adjusted under 35 U.S.C. 154(b) by 112 days.

(21) Appl. No.: 10/692,308

(22) Filed: Oct. 22, 2003

(65) Prior Publication Data

US 2004/0256140 A1 Dec. 23, 2004

(30) Foreign Application Priority Data

Oct. 23, 2002 (DE) ................................ 102 49 550

(51) Int. Cl.
 *H01B 12/00* (2006.01)
 *H01F 6/00* (2006.01)
 *H01L 39/00* (2006.01)

(52) U.S. Cl. ..................... 505/231; 505/234; 505/238; 505/431; 505/434; 174/125.1; 428/930; 428/699

(58) Field of Classification Search ............... 505/230, 505/237, 238
See application file for complete search history.

(56) References Cited

U.S. PATENT DOCUMENTS

| | | | |
|---|---|---|---|
| 6,440,211 B1 * | 8/2002 | Beach et al. .................... 117/9 |
| 6,555,256 B1 * | 4/2003 | Christen et al. ............. 428/697 |
| 6,610,632 B2 * | 8/2003 | Honjo et al. ................. 505/237 |
| 6,663,976 B2 * | 12/2003 | Beach et al. ................ 428/469 |
| 6,716,795 B2 * | 4/2004 | Norton et al. ............... 505/238 |
| 6,745,059 B2 * | 6/2004 | Buczek et al. ............... 505/230 |
| 6,812,191 B2 * | 11/2004 | Park et al. ................... 505/121 |
| 6,849,580 B2 * | 2/2005 | Norton et al. ............... 505/237 |
| 6,864,430 B2 * | 3/2005 | Hughey et al. ........... 174/125.1 |
| 6,943,656 B2 * | 9/2005 | Buczek et al. ............... 335/216 |
| 2004/0266628 A1 * | 12/2004 | Lee et al. .................... 505/238 |

FOREIGN PATENT DOCUMENTS

EP 0650205 A1 * 4/1995
EP 1174887 A2 * 1/2002

OTHER PUBLICATIONS

Alford et al, "High temperature superconducting thick films", Supercond. Sci. Technol. 10 (1997), pp. 169-185.*
Perkins et al. "Scanning potentiometry and magnetic imaging of current transport in high-temperature superconductor coated conductors", Supercond. Sci. Technol. 14 (2001), pp. 685-689.*
Marsh, George, "Time ripe for superconductivity?" Materials Today, Apr. 2002, pp. 46-50.*

* cited by examiner

*Primary Examiner*—Colleen P. Cooke
(74) *Attorney, Agent, or Firm*—Sofer & Haran, LLP

(57) ABSTRACT

The present invention relates to a superconducting cable conductor which contains a carrying element, on which is wound at least one layer comprising two or more superconducting conductor elements, the individual conductor elements of each layer being arranged next to one another, and the superconducting conducting elements are formed from a tape-type substrate coated with a superconducting material based on rare earth barium cuprate, preferably based on yttrium barium cuprates.

13 Claims, No Drawings

SUPER CONDUCTING CABLE CONDUCTOR WITH REBCO-COATED CONDUCTOR ELEMENTS

RELATED APPLICATION

This application is related to and claims the benefit of priority from German Patent Application No. 102 49 550.5, filed on Oct. 23, 2002, the entirety of which is incorporated herein by reference

BACKGROUND OF THE INVENTION

1. Field of the Invention

The present invention relates to a superconducting cable conductor with a superconducting material based on rare earth barium cuprates, the superconductor material being applied in layer form on a tape-type substrate. In particular, the invention relates to a superconducting cable conductor of this type for AC applications.

2. Description of the Prior Art

Superconducting cable conductors are usually constructed from a generally cylindrical carrying element with superconducting wires wound helically thereon as superconducting conductor elements.

The carrying element may comprise a conductive or nonconductive material and is usually configured in flexible fashion.

The superconducting conductor elements are wound helically on said carrying element in one or more layers. Each individual layer is obtained by a plurality of, for example tape-type, superconducting conductor elements being wound next to one another onto the carrying element or onto a layer that has already been wound onto the carrier element.

Thus, EP 0 650 205 52 describes a multilayered superconducting cable conductor for AC applications, multifilament wires being used as conductor elements.

The multifilament wires contain a multiplicity of 30 filament-type cores comprising a superconductor material which are embedded in a matrix comprising a normally conducting metal, in particular silver. In order to avoid AC losses on account of eddy currents and coupling currents, insulating layers comprising an insulating material are provided between the individual layers comprising superconducting wires.

The superconducting wires are obtained by filling for example pulverulent starting material, which can be converted into the desired superconductor material by means of suitable thermal treatment, into a casing comprising a normally conducting metal, preferably silver. The casing filled with the pulverulent starting material is subjected to a plastic deformation with drawing and rolling to form a long filament having a small diameter and is subsequently sintered. The individual filaments obtained are combined to form a bundle comprising a multiplicity of individual filaments and passed together into a further casing, which is in turn subjected to a plastic deformation and sintering. A superconducting multifilament wire with the desired number of filaments in a metal matrix is obtained as a result. The finished multifilament wire preferably has a tape form.

The superconductor material acquires the desired 20 high orientation as a result of the treatment described above, the crystallographic c axis essentially extending perpendicular to the current flow direction and the a-b plane extending parallel to the current flow direction. The orientation should preferably be as homogeneous as possible over the entire extent of the superconducting material.

Depending on the diameter of the carrying element onto which the multifilament wire is wound, and on the lay length of the individual turns, forces as a result of bending elongation and tensile stress are exerted on the wires during the winding process and in the unwound state. This may result in an impairment of the orientation of the superconducting phase and thus in a reduction of the superconducting properties.

In order to be able to obtain the greatest possible freedom with regard to the diameter of the carrying element and the lay length of the winding and thus with regard to the cable construction, a superconducting cable is desirable, therefore, in which no degradation of the superconducting wires occurs even in the case of a relatively high degree of bending for example in the case of a small diameter of the carrying element and/or a small lay length, and relatively high tension.

SUMMARY OF THE INVENTION

According to the invention, this object is achieved by means of a superconducting cable conductor which contains a carrying element, onto which is wound at least one layer comprising two or more superconducting conductor elements, the individual superconducting conductor elements of each layer being arranged next to one another, and the superconducting conductor elements contain a tape-type substrate coated with a semiconducting material based on rare earth barium cuprate.

Hereinafter, the superconducting conductor elements used according to the invention, comprising a tape-type substrate coated with a superconducting material based on rare earth barium cuprate, are also called "REBCO-coated conductor elements", where RE=one or more rare earth elements including lanthanum and yttrium, or "coated conductor elements".

As in the case of the superconducting multifilament wires described in the introduction, here too the quality of the superconducting properties depends on the extent of the orientation of the superconducting crystals in the layer. In order to achieve a high critical current, high current density and current-carrying capacity, it is advantageous, therefore, if the superconducting material in the coated conductor element has the highest possible biaxial orientation (texturing), the crystallographic c axes of the individual superconducting crystals being arranged perpendicular or essentially perpendicular to the surface of the tape-type substrate and the a-b planes being arranged parallel or essentially parallel to the surface of the tape-type substrate, so that the a-b planes extend in the current flow direction.

Coated conductor elements as are used according to the invention, methods for producing them, precursor materials suitable therefor for forming the superconducting material and suitable substrates are generally known to persons skilled in the art and described in numerous instances in the literature. By way of example, reference is made in this respect to N. McN Alford et al., "Topical review: High-temperature superconducting thick films" in Supercond. Sd. Technol. (1997) 169–185, J. L. MacManus-Driscoll "Recent developments in conductor processing of high irreversibility field superconductors" in Annu. Rev. Mater, Sd. volume 28 (1998) pages 421 to 462 and WO 98/58415.

In this case, the desired texturing of the superconducting layers is achieved by using specific substrates, the properties of the substrate, in particular the texture thereof, bringing about the orientation of the crystals growing in the superconducting layer.

Suitable methods and materials for producing coated conductor elements as may be used according to the invention, a layer comprising superconducting material being deposited on a substrate, are, for example, the ion beam assisted deposition (IEAD) or assisted biaxially textured substrates (RABiTS) methods as are described for example in Y. Jijima et al., "In-plane aligned YBCO thin films deposited on polycrystalline metal substrates", in Appl. Phys. Lett. 60 (1992) page 769 for IEAD and A. Goyal et al. "Fabrication of long range, biaxially textured, high Tc superconducting tapes~~in Appl. Phys. Lett. 69 (1996), page 1795 for RABiTS.

Further suitable deposition methods are pulsed laser deposition (PLD) as described for example in A. Usoskin et al., EUCAS 99, page 447 and by S. R. Foltyn et al., in IEEE Trans. on Applied Supercond., 9, (1999), page 1519, and the solution-assisted (sol-gel) method as described for example by M. P. Siegel et al., in Appl. Phys. Lett., volume 80, No. 15 (2002) pages 2710 to 2712. A further suitable method is the so-called $BaF_2$ method, as described for example by S. W. Lu et al. in Supercond. Sci. Technol., 14 (2001) pages 218 to 223, fluorine in the form of $BaF_2$ being added to the starting material for the formation of the superconductor material.

The substrate used for the coated conductor element that is to be used according to the invention may be any desired substrate provided that it neither adversely affects the superconductor material of the layer nor is impaired by the processing processes for forming the superconducting layer. Examples of substrates are monocrystalline ceramics, polycrystalline ceramics or metals.

The cross-sectional form of the tape-type substrate 25 may be selected as desired, in principle. The cross section may be in, for example, rectangular, square, oval, round, polygonal, trapezoidal, etc. form. An essentially rectangular form is generally preferred, however.

It goes without saying that substrates with a sufficient flexibility for the desired cable application are to be used for the superconducting conductor elements that are to be used according to the invention.

One or more thin intermediate layers may be 35 provided as buffer layer between the superconducting layer and the substrate.

The buffer layer prevents the substrate material from reacting with the superconducting material in an undesirable manner.

Thus, for example when using metals as substrates, a suitable buffer layer comprising a ceramic should be provided.

Examples of suitable materials for the buffer layer are zirconium oxide, stabilized zirconium oxide such as, for example, zirconium oxide stabilized with yttrium oxide (YSZ), $CeO_2$ and MgO, but also $SrTiO_3$, $LaAlO_3$.

A superconducting oxidic material based on rare earth barium cuprates is used as superconducting material for the present invention. The rare earth barium cuprates contain at least one rare earth element (RE) selected from among Y, La, Ce, Pr, Nd, Eu, Gd, Tb, Dy, Ho, Er, Tm, Yb and Lu, preferably yttrium or yttrium in combination with at least one further rare earth element.

Particularly preferred compounds have the general 20 formula

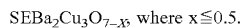

$SEBa_2Cu_3O_{7-x}$, where $x \leq 0.5$.

In addition, the rare earth barium cuprates may contain at least one further element selected from the group consisting of Be, Mg, Ca, Sr, Zn, Cd, Sc, Zr, Hf, Pt, Pd, Os, Ir, Ru, Ag, Au, Hg, Ti, Pb, Bi, Ti, S and F.

Particular preference is attached to $YBa_2Cu_3O_{7-x}$ where $x \leq 0.5$ (also called Y1, 2, 3), which may additionally contain at least one further rare earth element and/or at least one further element from the group of elements mentioned above.

For production purposes, the starting materials for the superconducting material, for example according to one of the methods mentioned above, are deposited on the substrate, which is optionally provided with a buffer layer, and are subjected to a thermal treatment with controlled fusion and cooling to form the desired superconducting 123 phase.

It is known that the 123 material can be obtained from a material of the composition $Se_2BaCuO$, the so-called 211 material, by controlled fusion and cooling.

In accordance with a preferred method, the texturing is effected by making use of the different peritectic solidification temperature of 123 materials with different rare earth elements.

For this purpose, at least two 211 materials which differ in terms of the RE component are arranged in strip form along the longitudinal direction on a tape-type substrate, the mutually adjoining longitudinal edges of the strips of 211 material being in contact.

A corresponding layer comprising barium cuprate and/or copper oxide is applied on the strips comprising the two different 211 materials for the purpose of setting the stoichiometry of the 123 material to be formed, which layer at least partially covers the strips. Since the barium cuprate and/or copper oxide has a lower melting point than the 211 materials, it is the first to melt during a subsequent thermal treatment. The melt that is formed infiltrates the underlying starting materials, the latter at least partially dissolving in the melt. The desired 123 material forms during cooling from this partial melt with the barium cuprate/copper oxide as liquid phase with dissolved solid 211 material.

At the same time, the rare earth elements migrate on account of diffusion and melting processes, concentration gradients for the respective rare earth elements of the starting materials forming in the opposite direction transversely with respect to the strip.

During slow isothermal cooling, the solidification 35 front advances from the side with the 123 material having the highest solidification temperature to the side with the 123 material having the lowest solidification temperature, a biaxial orientation of the crystals that form being effected.

Preferably, a strip comprising a 123 material is arranged as initiator on the side on which the 123 material having the higher solidification temperature forms, the rare earth element for said 123 material being chosen such that the solidification temperature of the 123 material is higher than the solidification temperature of the 123 materials that form.

In this case, this rare earth element also forms a concentrating gradient in the direction of the 211 starting material arranged on the opposite side.

A suitable material combination comprises an arrangement of Nd123, Y211 and Yb211 in this order, the following holding true for the peritectic solidification temperatures Tp: Tp Nd123>Tp Y123>Tp Yb123. According to this method, it is possible to obtain 20 biaxially textured layers having a thickness of 1 .mu.m, and in particular 5 .mu.m or more, an excellent biaxial orientation being possible even without corresponding preorientation of the substrates. Therefore, it is not necessary to use substrates which contain a lattice matching to the biaxial texturing to be formed.

A further embodiment for the above-described method for producing in particular biaxially textured superconducting layers, the texturing being effected independently of the substrate, is described in DE 101 28 320 C1, to the entire contents of which reference is made here. Here, too, a concentration gradient, and thus a temperature gradient, is formed by the addition of further rare earth elements.

Above-described methods making use of temperature gradients make ±t possible to obtain polycrystalline layers with large biaxially oriented crystals through to monocrystalline layers. The misorientation of the crystals in the layer is preferably not more than 7°.

Layers of this type are particularly preferred for 5 superconducting applications.

The core of the superconducting cable conductor according to the invention is formed by the carrying element. In principle, the carrying elements that are known per se for the production of superconducting cable conductors can be used for the present invention. Usually, the carrying element used according to the invention is essentially cylindrical.

The carrying element may be formed as a tube or as a solid core element.

If it is formed as a tube, the cavity in the interior of the tube may be used as a channel for the cooling medium. The cooling medium flows through the cavity and in the process transports away the heat loss arising during the use of the superconducting cable.

The carrying element may generally be formed from a metal or plastic and usually has a low electrical conductivity.

Provided that the required flexibility is given, it is also possible to use any other suitable material desired.

In accordance with a particular embodiment, however, the carrying element may be formed as a solid core element comprising an electrical conductor. In this case, in the event of a short circuit, when the superconducting layer undergoes transition to the normally conducting state, the electrically conductive core element can carry the current and damage to the superconducting layer can thus be avoided.

It is essential for the carrying element to be flexible. This can be achieved by the carrying element having an annular or spiral corrugation. In this case, the individual waves are arranged along the longitudinal extent of the carrying element parallel in the case of the annular corrugation, and obliquely in the case of the spiral corrugation, with respect to the cross section of the carrying element. However, the carrying element may also be formed as a helix.

The carrying element may have, as required, an armoring comprising a metal or plastic braiding, for example comprising a high-grade steel braiding.

The carrying element may furthermore have a taping comprising metal or plastic tapes, for example a high-grade steel tape, which are wound helically next to one another onto the carrying element. This may result in a mechanical reinforcement of the carrying element. At the same time, the armoring or the taping serves to form a smooth surface as a support for the coated conductor elements.

If the armoring comprises a metallically conductive 20 material, it may likewise serve to take up short-circuit currents.

A padding may be provided, as required. For this purpose, one or more layers of semiconductive or insulating tape may be applied to the carrying element, said layers being wound helically onto the carrying element with or without an overlap.

In order to form the individual layers, a plurality of coated conductor elements are wound helically next to one another onto the carrying element or onto a corresponding underlying layer comprising coated conductor elements.

The individual layers may be wound onto the carrying element in the same sense or in opposite senses.

In addition, all of the layers or individual layers 35 may have different lay lengths or angles for the winding. It is possible to achieve a uniform current distribution over the individual layers through the selection of the winding direction and/or the angles of the winding. This is of importance for applications with alternating current since here, in the absence of corresponding measures, a nonuniform current distribution may occur over the individual layers, with a different quantity of current flowing in the individual layers.

If a very high current flows in one layer, for 10 example, there is the risk of the critical limit value being exceeded.

Since the coated conductor elements with a superconducting layer based on rare earth barium cuprate that are used according to the invention can withstand even a relatively high bending elongation and a relatively large tension without degradation and thus impairment of the orientation of the superconducting material, superconducting cables which may have a carrying element having a low diameter may be obtained according to the invention.

On account of the possible low diameter of the carrying element, given comparable superconducting properties it is possible to obtain thinner cables or, given a comparable thickness to conventional cables based on multifilament wires, the cables according to the invention have a higher superconducting cross section.

The lay length may also be chosen to be variable to a greater extent.

The greater degrees of freedom that become possible 30 as a result of this in the configuration of the cable mean that the cable, as required, may be configured as exactly as possible for the respective application. It is particularly advantageous that overall thinner cables can be obtained which nevertheless have sufficient superconducting properties.

Moreover, a greater range of variation for the angles for the winding becomes possible, so that an optimum coordination of the angles for the individual layers is possible for achieving a uniform current distribution over the layers.

DETAILED DESCRIPTION OF THE PREFERRED EMBODIMENT

The text below specifies concrete examples for the configuration of a superconducting cable conductor according to the invention and for superconducting conductor elements that can be used therefor, of the kind that may usually be used. It goes without saying that, as required and depending on the application, deviations from the details that are mentioned here merely by way of example are possible and concomitantly encompassed by the invention. Construction of the superconducting conductor elements Thickness of the substrate: approximately 0.025 mm to approximately 2 mm Width of the substrate: approximately 10 mm Thickness of the superconducting layer: approximately 1 µm to 5 µm Buffer layer: approximately 1 µm If the substrate comprises nickel or an Ni alloy, for example, ZSY is preferably used as the buffer layer.

The number of superconducting conductor elements per layer generally depends on the external diameter of the carrying element and the tape width. Thus, by way of example, for a carrying element having a diameter of 25 mm, it is possible to use 7 conductor elements as described above per layer, and with 30 mm it is possible to use 9 tapes per layer. 4 to 6 is a customary number of layers.

In a cable conductor with 4 layers, in order to achieve a uniform current distribution, layers 1 and 2 may be wound in the same sense but at different angles and layers 3 and 4 may be wound in the opposite sense thereto, likewise at different angles.

With a cable conductor according to the invention for example with a configuration as described above, it is possible to obtain current densities of 1 000 000 to 3 000 000 A/cm$^2$.

In order to avoid electrical interactions between the individual layers comprising coated conductor elements, an electrically insulating layer may be provided between each layer or after a specific number of layers.

Said electrically insulating layer may be formed from a film or a tape comprising an insulating material. A tape may likewise be wound helically onto the corresponding layer comprising coated conductor elements in a manner known per se.

An electrically insulating layer may be provided, as required, between the carrying element and the first layer comprising superconducting conductor elements. Suitable materials for said electrically insulating layer are the same as those mentioned above for the insulating layers which are arranged between the individual layers comprising superconducting conductor elements.

Individual conductor elements of a layer, groups of a plurality of conductor elements of a layer or all the conductor elements of a layer may also be electrically insulated from one another.

For this purpose, an insulating material may be provided between the corresponding conductor elements.

By way of example, a tape comprising an insulating material may be wound parallel to the conductor elements of a layer, so that the tape runs between the individual conductor element strands and isolates the latter from one another.

Any suitable electrically insulating material may be used per se as material for the electrical insulation between the individual layers, between carrying element and superconducting winding and between the conductor elements of a layer.

Examples are plastics, paper or plastic-laminated paper and also other materials known therefor. The insulations described above, i.e. between the superconducting layers, layer and carrying element and between the conductor elements of a layer, may also be used in combination with one another.

An example of the production of a preferred coated conductor element is given below. In this case, the production is explained by way of example using a piece of tape comprising AgPd 12.5 (palladium in percent by weight) as substrate having a length of approximately 5 cm, a thickness of approximately 100 μm and a width of approximately 2 cm. It goes without saying, however, that the method can also be applied to substrates having different dimensions from those mentioned by way of example above.

The starting materials were present as a powder with an average particle diameter in the range of from 1 to 50 μm.

Brushes or an airbrush were used to arrange on the carrier material next to one another a 1 mm wide line comprising Nd123 (1) (5 cm long, overall about 40 mg Nd123), a 5 mm wide line comprising Y211 (2) (5 cm long, overall about 200 mg Y211) and a two millimeter wide line comprising Yb211(3) (5 cm long, overall about 90 mg) next to one another such that adjacent longitudinal edges were in contact with one another. The resulting strip was covered with a layer comprising overall 400 mg of $Ba_2C_3O_5$.

The carrier material thus coated was placed in air in a commercially available chamber furnace comprising an $Al_2O_3$ block and subjected to the following thermal treatment.

| Start Temperature | Heating Rate | Target Temperature | Hold Time |
| --- | --- | --- | --- |
| Room temperature | 500° C./h | 500° C. | 2 h |
| 500° C. | 500° C./h | 975° C. | 1 h |
| 975° C. | 0.5–1° C./h | 950° C. | 0 min |
| 950° C. | 100° C./h | Room Temperature | |

During the first step of this thermal treatment, primarily the solvents used, water with 2% by weight of polyvinyl alcohol (PVA), were evaporated.

During the second step of the thermal treatment, the mixture comprising silver, barium cuprate and copper oxide—the liquid phase—fused and formed a doped barium cuprate melt which infiltrated the underlying starting materials arranged next to one another. The starting materials (1), (2) and (3) were at least partially dissolved by this liquid phase. A concentration gradient of neodymium formed, which extended from starting material (1) proceeding in the direction of starting material (3). Conversely, a concentration gradient of ytterbium additionally formed, which extended from starting material (3) proceeding in the direction of starting material (1).

On account of the different peritectic solidification temperatures Tp for different superconductors (RE)$Ba_2Cu_3O_7$-X where Tp (Nd123)>Tp (Y123)>Tp (Yb123), a gradient of the solidification temperature resulted in the overall system on account of the concentration gradient mentioned above. During the spatially isothermal, slow cooling in step 3, this promoted a directional growth of the superconductor crystals parallel to the gradient of the solidification temperature.

In order to produce the superconductivity, the samples obtained were heated to 500° C. for 50 to 100 hours in an atmosphere with an oxygen partial pressure of 1 bar. In this method step, the oxygen content of the samples was optimized to the effect of x in $YBa_2Cu_3O_{7-x}$ becoming minimal but always less than 0.5. The heating and cooling rates of the oxygen treatment were about 100° C./h.

The thicknesses of the thick layers obtained were typically in the range of between 10 and 15 μm.

The invention claimed is:

1. A superconducting cable conductor, wherein the superconducting cable conductor contains a carrying element, onto which is wound at least one layer comprising two or more superconducting conductor elements, the individual superconducting conductor elements of each single layer being arranged side-by-side in said layer, and the superconducting conductor elements contain a tape-type substrate coated with a superconducting material based on rare earth barium cuprate, wherein the superconducting material forms a layer having thickness of at least 1 μm, said superconducting conductor elements being configured to withstand bending stress generated by winding.

2. The superconducting cable conductor claimed in claim 1, wherein, in the rare earth barium cuprate, the rare earth component is yttrium or contains yttrium.

3. The superconducting cable conductor claimed in claim 1, wherein the rare earth barium cuprate contains at least one further element selected from among Be, Mg, Ca, Sr, Zn, Cd, Sc, Zr, Hf, Pt, Pd, Os, Ir, Ru, Ag, Au, Hg, Tl, Pb, Bi, Ti, S and F.

4. The superconducting cable conductor claimed in claim 1, wherein the layer comprising rare earth barium cuprate has a biaxial orientation.

5. The superconducting cable conductor claimed in claim 1, wherein the substrate used for the conductor element is a substrate which has no lattice matching for the texturing of the layer comprising superconducting material.

6. The superconducting cable conductor claimed in claim 1, wherein the cable conductor has four to six layers comprising superconducting conductor elements.

7. The superconducting cable conductor claimed in claim 1, wherein an electrically insulating layer is provided at least between two layers comprising superconducting conductor elements.

8. The superconducting cable conductor claimed in claim 1, wherein an insulating layer is provided between carrying element and first layer comprising superconducting conductor elements.

9. The superconducting cable conductor claimed in claim 1, wherein the carrying element is hollow.

10. The superconducting element claimed in claim 1, wherein the carrying element is solid.

11. The superconducting cable conductor claimed in claim 10, wherein the carrying element comprises an electrically conductive material.

12. The superconducting cable conductor claimed in claim 1, wherein the carrying element has an annular corrugation or spiral corrugation.

13. A method for producing a superconducting cable conductor, said method comprising the steps of:

providing a carrying element, and winding thereon at least one layer comprising two or more superconducting conductor elements, said superconducting elements containing a tape-type substrate coated with a superconducting material based on rare earth barium cuprate; and arranging the individual superconducting conductor elements of each layer side-by-side, wherein the superconducting material forms a layer having a thickness of at least 1 μm, said superconducting conductor elements being configured to withstand bending stress generated by winding.

* * * * *

UNITED STATES PATENT AND TRADEMARK OFFICE
CERTIFICATE OF CORRECTION

PATENT NO. : 7,231,239 B2
APPLICATION NO. : 10/692308
DATED : June 12, 2007
INVENTOR(S) : Frank Schmidt It is certified that error appears in the above-identified patent and that said Letters Patent is hereby corrected as shown below:

Title page, item [73] Assignee: insert -- Nexans Superconductors GMBH--

Signed and Sealed this

Sixteenth Day of October, 2007

JON W. DUDAS
*Director of the United States Patent and Trademark Office*